J. OGDEN.
SHEARS.
APPLICATION FILED FEB. 10, 1909.

1,005,287.

Patented Oct. 10, 1911.

Witnesses
W. R. Edelen.
E. B. Salisbury.

Inventor
John Ogden
By Alex. J. Wedderburn Jr.
Attorney

UNITED STATES PATENT OFFICE.

JOHN OGDEN, OF FALL RIVER, MASSACHUSETTS.

SHEARS.

1,005,287. Specification of Letters Patent. Patented Oct. 10, 1911.

Application filed February 10, 1909. Serial No. 477,196.

*To all whom it may concern:*

Be it known that I, JOHN OGDEN, a citizen of the United States, residing at Fall River, in the county of Bristol and State of Massachusetts, have invented certain new and useful Improvements in Shears, of which the following is a specification.

This invention relates to improvements in duplex clipping shears which are provided with double cutting edges, and operated by one pair of handles.

This invention further relates to the novel means for operating the central shear blades which act in unison with its opposing outside blades.

This invention further relates to the means for operating the outside shear blades through the medium of the handles which are integral with, and operate the central blades.

This invention further relates to the pivotal connections of the outside arms operating the outside shear blades.

This invention further relates to the links connecting the outside shear arms to the central shear arms.

This invention further relates to the means for utilizing the back edges of the central blades or shears.

The object of the present invention is to provide suitable clipping shears that will cut double. The central shears can also cut on the back portion thereof on the reverse movement, making three shears in one, and are operated by a single pair of handles.

The advantage of this device over the ordinary clipping shears, is obvious, as double work can be accomplished with one movement of the hand. The construction and arrangement of the device is such that it requires no more effort to operate this double shear than an ordinary single shear.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, in which:—

Figure 1:
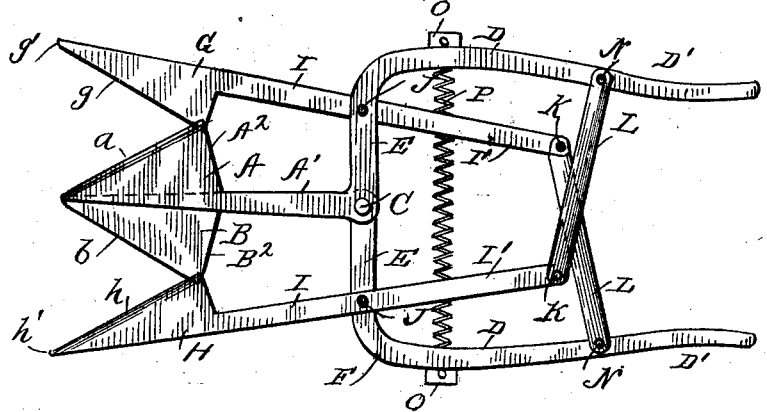
Figure 2:
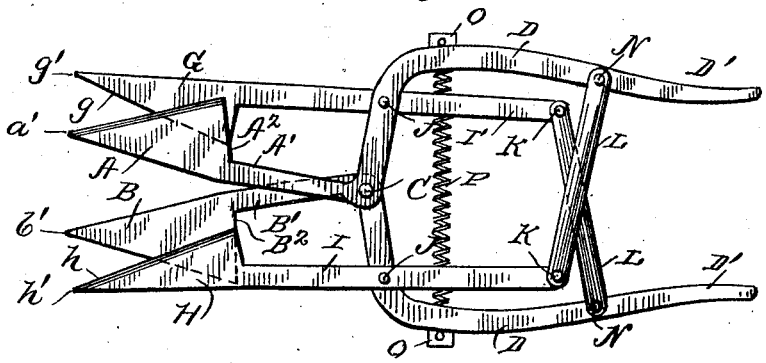

Figure 1 represents a side elevation of the improved clipping shears, in an inoperative position. Fig. 2 represents a side elevation of the device in an operative position.

These improved duplex clipping shears are provided with a central portion which consists of two cutting blades A and B, respectively. These blades are provided with arms A' and B', and are pivoted at C. Extending from said arms A' and B', at the pivotal portion C, are right angled arms E, which are rounded at their corners F, and terminate in handles D, the latter being provided with an extension D', for a handhold when operating said shears. Said blades A and B are provided with cutting edges $a$ and $b$, respectively. Contacting and overlapping the heels of said blades A and B, at their cutting edges are opposing blades G and H, having cutting edges $g$ and $h$, and points $g'$ and $h'$. Extending from and integral with said opposing blades G and H, are secondary arms I, which extend rearwardly, and are pivoted to the right angled arms E of the blades A and B. Said arms I are also pivoted at their extreme ends I', at K to links L, for operating said blades when the handles D are opening or closing. The opposite ends of said links L, are pivoted to the handles D, at the points N. By this construction of the device, the duplex shears or clippers can be operated, giving two independent cuts or incisions at one operation or movement of the handles D. Attached to the handle D, at the points O, are lugs for pivotally securing a spiral spring P, said spring being utilized for returning said shear blades to their normal position.

Fig. 1 of the accompanying drawings indicates the device in an inoperative position, with the blades distended through the medium of the aforesaid spring P.

In Fig. 2, the shear blades are overlapping each other, the shears being in an operative position.

When the central blades A and B are closed, the points $a'$ and $b'$, will contact each other, also the points $g'$ and $h'$ will contact the points $a'$ and $b'$. The overlapping of the central blades A and B at their back can also be utilized as cutting edges, thus making a triple cutting device with one operation of the handles D.

This invention can be utilized for various purposes outside of a clipping device or shears in the vast field of improvements at present and in the future.

I do not limit this invention to the exact construction as herein shown and described, as different means can be employed for accomplishing the same results which will come within the scope of this invention.

That which I desire to secure by Letters Patent is:—

1. In a shear, or clipping device, a pair of handles pivoted at their junction, members provided with cutting edges extending out at an angle therefrom, links secured to said handles, secondary arms pivoted at an intermediate position on said handles, having cutting edges on the free ends thereof, said arms connected to said links and adapted to operate the cutting edges thereon simultaneously with the cutting edges on said handle members.

2. In a shear or clipping device a pair of handles, integral arms extending at an angle from said pair of handles, said handles pivoted at their junction, cutting edges on said arms, a secondary pair of arms provided with cutting edges connected to said handles and pivoted to said first pair of arms.

3. In a shear or clipping device intermediate cutting members, a pair of handles rigidly secured thereto, a secondary pair of cutting members adjacent said intermediate cutting members, a secondary pair of arms rigidly connected thereto, and connected to said handles and links secured to said handles by means of which said cutting members may be simultaneously operated.

4. In a shear or clipping device, a pair of handles pivoted at their junction, a pair of cutting members integral therewith, a pair of arms, cutting members rigidly secured thereto, said arms intermediately pivoted to said handles and operating means connecting said arms with said handles whereby the cutting members may be simultaneously operated.

5. In a shear or cutting device, a pair of handles pivoted at their junction, arms extending at an angle therefrom, cutting members attached to said arms, a secondary pair of arms, cutting members integral therewith, said secondary pair of arms, intermediately pivoted to said handles, links connecting the ends of said secondary pair of arms to said handles as means for operating the plurality of cutting members and a spring for returning said members to normal position.

In testimony whereof I affix my signature in presence of two witnesses.

JOHN OGDEN.

Witnesses:
STUART G. BOWIE,
HAROLD MELLOR.

---

Copies of this patent may be obtained for five cents each, by addressing the "Commissioner of Patents, Washington, D. C."